United States Patent
Murschall et al.

(10) Patent No.: US 6,902,818 B2
(45) Date of Patent: Jun. 7, 2005

(54) TRANSPARENT, UV RESISTANT, THERMOFORMABLE FILM MADE FROM CRYSTALLIZABLE THERMOPLASTICS, ITS USE AND PROCESS FOR ITS PRODUCTION

(75) Inventors: Ursula Murschall, Nierstein (DE); Ulrich Kern, Ingelheim (DE); Andreas Stopp, Ingelheim (DE); Guenther Crass, Taunusstein (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 10/181,514

(22) PCT Filed: Jan. 10, 2001

(86) PCT No.: PCT/EP01/00200

§ 371 (c)(1),
(2), (4) Date: Jul. 18, 2002

(87) PCT Pub. No.: WO01/53393

PCT Pub. Date: Jul. 26, 2001

(65) Prior Publication Data

US 2003/0068500 A1 Apr. 10, 2003

(30) Foreign Application Priority Data

Jan. 20, 2000 (DE) ......................................... 100 02 172

(51) Int. Cl.⁷ ............................................. B32B 27/36

(52) U.S. Cl. ........................ 428/480; 528/301; 528/308; 528/308.6; 524/81; 524/86; 264/211.12; 264/211.17

(58) Field of Search .................................. 528/301, 308, 528/308.6; 524/81, 86; 428/480; 264/211.12, 211.17

(56) References Cited

U.S. PATENT DOCUMENTS 5,631,124 A   5/1997   Ikuhara et al.

FOREIGN PATENT DOCUMENTS

| DE | 196 30 599 A1 | 2/1998 |
| EP | 0 620 245 A1 | 10/1994 |
| EP | 0 678 376 A1 | 10/1995 |
| EP | 0 882 758 A1 | 12/1998 |
| EP | 1 038 905 A2 | 9/2000 |
| WO | WO 98/06575 A1 | 2/1998 |

*Primary Examiner*—Samuel A. Acquah
(74) *Attorney, Agent, or Firm*—ProPat, L.L.C.

(57) ABSTRACT

The invention relates to a transparent, UV-stabilized, single or multi-layered thermoformable film which contains, as a principal constituent, a crystallizable thermoplastic, preferably polyethylene terephthalate, and at least one UV-stabilizer. The inventive films are characterized by having a good stretchability, thermoformability and good optical and mechanical properties. Said films are suitable for outdoor uses just like shaped bodies made of the same.

25 Claims, No Drawings

TRANSPARENT, UV RESISTANT, THERMOFORMABLE FILM MADE FROM CRYSTALLIZABLE THERMOPLASTICS, ITS USE AND PROCESS FOR ITS PRODUCTION

Transparent, UV-resistant, thermoformable film made from crystallizable thermoplastics, its use and process for its production.

The invention relates to a transparent, UV-resistant, thermoformable film made from crystallizable thermoplastics, the thickness of which is preferably in the range from 10 to 500 μm. The film comprises at least one UV stabilizer as light stabilizer and has good orientability, good thermoformability, and very good optical and mechanical properties. The invention further relates to the use of this film and to a process for its production.

BACKGROUND OF THE INVENTION

Transparent films made from crystallizable thermoplastics with a thickness from 1 to 500 μm are well known.

These films are not thermoformable and do not comprise any UV stabilizers as light stabilizers. Neither the films nor the items or moldings produced from them are therefore suitable for outdoor applications. Even after a short period in outdoor applications, these films and moldings exhibit yellowing and impairment of mechanical properties due to photooxidative degradation by sunlight.

EP-A-0 620 245 describes films with improved heat resistance. These films comprise antioxidants suitable for scavenging free radicals formed in the film and for degrading any peroxide formed. However, that specification makes no proposal as to how the UV resistance of films of this type may be improved. Nor does that specification state whether these films are suitable for thermoforming processes.

It is an object of the present invention, therefore, to provide a transparent, thermoformable film with a thickness which is preferably from 10 to 500 μm and which, in addition to good orientability, good mechanical properties, and also good optical properties, in particular has high UV resistance and thermoformability.

High UV resistance means that the films are not damaged, or are damaged only to an extremely small degree, by sunlight or by other UV radiation, and therefore the films and moldings produced from them are suitable for outdoor applications and/or critical indoor applications. In particular after a number of years of outdoor use the films should not yellow or show embrittlement or surface-cracking, nor show any impairment of mechanical properties. High UV resistance therefore means that the film absorbs UV light and transmits light only when the visible range has been reached.

Examples of good optical properties are high light transmittance (>84%), high surface gloss (>120), extremely low haze (<20%), and low Yellowness Index (YI<10).

Examples of good mechanical properties are high modulus of elasticity ($E_{MD}$>3200 N/mm$^2$; $E_{TD}$>3500 N/mm$^2$), and also good values for tensile stress at break (in MD>100 N/mm$^2$; in TD>130 N/mm$^2$).

Good orientability includes the ability of the film during its production to give excellent orientation in both longitudinal and transverse directions, without break-offs. An example of adequate thermoformability is the ability of the film to be thermoformed on commercially available thermoforming machinery without uneconomic predrying, to give complex and large-surface-area moldings.

The film of the invention should also be recyclable, in particular without loss of optical or mechanical properties, so that it can also be used for short-lived products and in the construction of exhibition stands, for example.

BRIEF DESCRIPTIONS OF THE INVENTION

The object of the invention is achieved by way of a transparent thermoformable film having a thickness which is preferably from 10 to 500 μm, and comprising, as the main constituent, a crystallizable thermoplastic, and characterized in that the film comprises at least one UV stabilizer as light stabilizer.

The film has preferably been mono- or biaxially oriented.

DETAILED DESCRIPTION OF THE INVENTION

The transparent film comprises, as main constituent, a crystallizable thermoplastic. According to the invention, crystallizable thermoplastics are crystallizable homopolymers, e.g. polyesters, polyolefins, or polyamides; crystallizable copolymers, e.g. polyethylene terephthalate/isophthalate, polyethylene terephthal/naphthalate; crystallizable compositions; crystallizable recycled material, and other types of crystallizable thermoplastics.

Preferred suitable crystallizable or semicrystalline thermoplastics are polyesters such as polyethylene terephthalate, polybutylene terephthalate, polyethylene naphthalate, preferably polyethylene terephthalate (PET). It is also possible to use a mixture of crystallizable thermoplastics. The crystallinity of the thermoplastics is preferably in the range from 5 to 65%.

The transparent film may be either single-layer or multilayer. The transparent film may also have been coated with various copolyesters or adhesion promoters.

Light, in particular the ultraviolet content of solar radiation, i.e. the wavelength region from 280 to 400 nm, induces degradation in thermoplastics, as a result of which their appearance changes due to color change or yellowing, and there is also an adverse effect on mechanical/physical properties.

Inhibition of this photooxidative degradation is of considerable industrial and economic importance, since otherwise there are drastic limitations on the applications of many thermoplastics.

The absorption of UV light by polyethylene terephthalates, for example, starts at below 360 nm, increases markedly below 320 nm and is very pronounced at below 300 nm. Maximum absorption occurs at between 280 and 300 nm.

In the presence of oxygen it is mainly chain cleavage which occurs, but there is no crosslinking. The predominant photooxidation products in quantity terms are carbon monoxide, carbon dioxide and carboxylic acids. Besides the direct photolysis of the ester groups, consideration has to be given to oxidation reactions which likewise form carbon dioxide, via peroxide radicals.

In the photooxidation of polyethylene terephthalates there can also be cleavage of hydrogen at the position a to the ester groups, giving hydroperoxides and decomposition products of these, and this may be accompanied by chain cleavage (H. Day, D. M. Wiles: J. Appl. Polym. Sci 16, 1972, p. 203).

UV stabilizers, i.e. light stabilizers which are UV absorbers, are chemical compounds which can intervene in the physical and chemical processes of light-induced degradation. Carbon black and other pigments can give some protection from light. However, these substances are unsuitable for transparent films, since they cause discoloration or color change. The only compounds suitable for transparent matt films are those organic or organometallic compounds which produce no, or only extremely slight, color or color change in the thermoplastic to be stabilized, that is to say they are soluble in the thermoplastic.

For the purposes of the present invention, UV stabilizers suitable as light stabilizers are those which absorb at least 70%, preferably 80%, particularly preferably 90%, of the UV light in the wavelength region from 180 to 380 nm, preferably from 280 to 350 nm. These are particularly suitable if they are thermally stable in the temperature range from 260 to 300° C., that is to say they do not decompose and do not cause release of gases. Examples of UV stabilizers suitable as light stabilizers are 2-hydroxybenzophenones, 2-hydroxybenzotriazoles, organonickel compounds, salicylic esters, cinnamic ester derivatives, resorcinol monobenzoates, oxanilides, hydroxybenzoic esters, and sterically hindered amines and triazines, and among these preference is given to the 2-hydroxybenzotriazoles and the triazines.

The UV stabilizer(s) is (are) preferably present in the outer layer(s). The core layer may also have UV stabilizer, if required.

It was highly surprising that the use of the abovementioned UV stabilizers in films gave the desired result. The skilled worker would probably first have attempted to achieve a certain degree of UV resistance by way of an antioxidant, but would have found that the film rapidly yellows on weathering.

In the knowledge that UV stabilizers absorb UV light and therefore provide protection, the skilled worker would be likely to have used commercially available UV stabilizers. He would then have observed that the UV stabilizer has unsatisfactory thermal stability and at temperatures of from 200 to 240° C. decomposes and releases gases, and large amounts (from about 10 to 15% by weight) of the UV stabilizer have to be incorporated so that the UV light is absorbed and the film therefore not damaged.

At these high concentrations it would have been observed that the film is already yellow just after it has been produced, with Yellowness Index deviations (YI) around 25. It would also have been observed that its mechanical properties are adversely affected. Orientation would have produced exceptional problems, such as break-offs due to unsatisfactory strength, i.e. modulus of elasticity too low, die deposits, causing profile variations, roller deposits from the UV stabilizer, causing impairment of optical properties (defective adhesion, nonuniform surface), and deposits in stretching frames or heat-setting frames, dropping onto the film.

It was therefore more than surprising that even low concentrations of the UV stabilizer achieve excellent UV protection. It was very surprising that, together with this excellent UV protection:

within the accuracy of measurement, the Yellowness Index of the film is unchanged from that of an unstabilized film;

there were no releases of gases, no die deposits and no frame condensation, and the film therefore has excellent optical properties and excellent profile and layflat, and the UV-stabilized film has excellent stretchability, and can therefore be produced in a reliable and stable manner on high-speed film lines at speeds of up to 420 m/min.

It is moreover very surprising that it is also possible to reuse recycled material without any adverse effect on the Yellowness Index of the film.

It is significant for the invention that the crystallizable thermoplastic has a diethylene glycol content (DEG content) of $\geq 1.0\%$ by weight, preferably $\geq 1.2\%$ by weight, in particular $\geq 1.3\%$ by weight, and/or a polyethylene glycol content (PEG content) of $\geq 1.0\%$ by weight, preferably $\geq 1.2\%$ by weight, in particular $\geq 1.3\%$ by weight, and/or an isophthalic acid content (IPA) of from 3 to 10% by weight.

In one particularly preferred embodiment, the film of the invention comprises from 0.01 to 5.0% by weight of 2-(4,6-diphenyl-1,3,5-triazin-2-yl)-5-(hexyl)oxyphenol of the formula

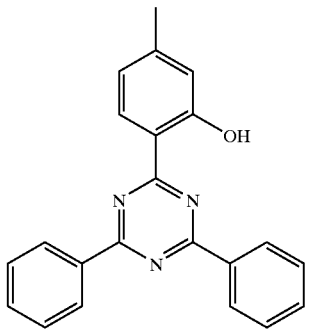

or from 0.01 to 5.0% by weight of 2,2-methylenebis(6-(2H-benzotriazol-2-yl)-4-(1,1,2,2-tetramethylpropyl)phenol of the formula

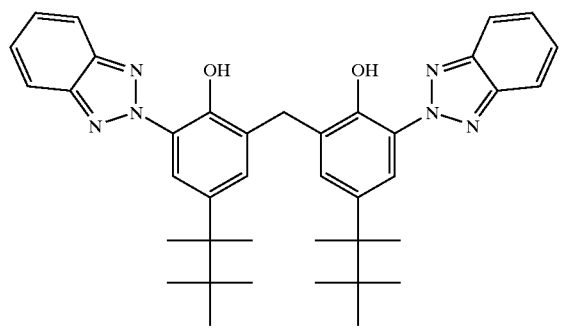

In one preferred embodiment, it is also possible to use mixtures of these two UV stabilizers or mixtures of at least one of these two UV stabilizers with other UV stabilizers, the total concentration of light stabilizer preferably being from 0.01 to 5% by weight, based on the weight of crystallizable polyethylene terephthalate.

It was more than surprising that, by virtue of higher diethylene glycol content and/or polyethylene glycol content and/or IPA content than in standard thermoplastics, the films can be thermoformed cost-effectively on commercially available thermoforming plants and give excellent reproduction of detail.

The surface gloss of the films of the invention, measured to DIN 67530 (measurement angle 20°), is greater than 120, preferably greater than 140, and the light transmittance L, measured to ASTM D 1003, is more than 84%, preferably more than 86%, and the haze of the film, measured to ASTM D 1003, is less than 20%, preferably less than 15%, surprisingly good for the UV resistance achieved.

The standard viscosity SV (DCA) of the polyethylene terephthalate, measured in dichloroacetic acid to DIN 53728, is preferably from 600 to 1000, with preference from 700 to 900. The crystalline melting point measured by DSC at a heating rate of 10° C./min is preferably in the range from 220 to 280° C.

The polyethylene terephthalate (PET) preferably has a diethylene glycol content (DEG content) and/or polyethylene glycol content (PEG content) 15 greater than 1.3% by weight, in particular >1.5% by weight. In one particularly preferred embodiment, the DEG content and/or PEG content is from 1.6 to 5% by weight. According to the invention, the max. DEG and/or PEG content is about 5.0% by weight.

It is surprising here that oriented PET films can be thermoformed by virtue of a diethylene glycol content and/or polyethylene glycol content higher than in standard polyester.

The thermoforming process generally encompasses the steps of predrying, heating, molding, cooling, demolding, conditioning. Surprisingly, in the thermoforming process it was found that the films of the invention can be thermoformed without prior predrying. This advantage drastically reduces the costs of the forming process in comparison with thermoformable polycarbonate films or thermoformable polymethyl methacrylate films, for which, depending on thickness, predrying times of from 10 to 15 hours are required at from 100 to 120° C.

The film of the invention, preferably a PET film, comprising at least one UV stabilizer, may be single-layer or multilayer.

In the multilayer embodiment, the film has a structure of at least one core layer and at least one outer layer, and particular preference is given here to a three-layer structure of type A-B-A or A-B-C. The thicknesses of the outer layers are preferably from 0.5 to 2 $\mu$m.

A substantive factor for the multilayer embodiment is that the DEG content and/or PEG content and the standard viscosity of the crystallizable thermoplastic, e.g. the polyethylene terephthalate, of the core layer are similar to those of the polyethylene terephthalate or the thermoplastic of the outer layer(s) which is (are) adjacent to the core layer.

In one particular embodiment, the outer layers may also be composed of a polyethylene naphthalate homopolymer or of a polyethylene terephthalate-polyethylene naphthalate copolymer, or of a composition.

In this embodiment, the thermoplastics of the outer layers likewise have standard viscosity similar to that of the thermoplastic, e.g. the polyethylene terephthalate, of the core layer.

In the multilayer embodiment, the UV stabilizer is preferably present in the outer layer(s). However, the core layer may also have UV stabilizers if necessary.

Unlike in the single-layer embodiment, the concentration of the stabilizer(s) here is based on the weight of thermoplastic in the layer which has stabilizer(s). Here, again, preferred concentrations are from 0.01 to 5.0% by weight.

Very surprisingly, weathering tests to the test specification of ISO 4892 using the Atlas Ci65 Weather-Ometer showed that in the case of a three-layer film the provision of UV stabilizers in the outer layers of from 0.5 to 2 $\mu$m in thickness is fully sufficient to improve UV resistance.

The UV-stabilized films having more than one layer and produced via known coextrusion technology are therefore of major commercial interest when compared with fully UV-resistant monofilms, since less UV stabilizer is needed to give comparable UV resistance.

There may also be provision, on at least one side of the film, of a scratch-resistant coating, a copolyester or an adhesion promoter.

Weathering tests have shown that, even after from 5 to 7 years in an outdoor application (extrapolated from the specific weathering tests), the UV-stabilized films of the invention generally show no increase in yellowing, no embrittlement, no loss of surface gloss, no surface cracking and no impairment of mechanical properties.

During production of the film of the invention it was also found that the UV-stabilized film can readily be oriented longitudinally and transversely without break-offs. In addition, no releases of gases of any type from the UV stabilizer were found during the production process. This is very advantageous, since most UV stabilizers evolve unpleasant gases at extrusion temperatures above 260° C., and are therefore of no use.

The film of the invention or the molding may moreover readily be recycled without polluting the environment and without loss of mechanical properties, and the film is therefore suitable for use as short-lived advertising placards, for example, or other promotional items.

The film may, furthermore, be thermoformed without predrying, and complete moldings may therefore be produced therefrom.

Examples of parameters found for the thermoforming process were as follows.

| Step of process | Film of invention |
| --- | --- |
| Predrying | Not required |
| Mold temperature ° C. | 100–160 |
| Heat time | <5 sec per 10 $\mu$m of thickness |
| Film temperature during shaping ° C. | 160–200 |
| Possible orientation factor | 1.5–2.0 |
| Reproduction of detail | Good |
| Shrinkage % | <1.5 |

One way of producing the film of the invention is by an extrusion process on an extrusion line.

The light stabilizer may be added before the material leaves the producer of the thermoplastic polymer, or may be metered in to the extruder during film production.

The DEG and/or PEG content of the polyethylene terephthalate are advantageously established by the producer of the raw material, during the polymerization process.

Adding the light stabilizer by way of masterbatch technology is particularly preferred. The light stabilizer is dispersed in a solid carrier material. Solid carrier materials which may be used are the thermoplastic itself, e.g. the polyethylene terephthalate, or else other polymers sufficiently compatible with the thermoplastic.

In masterbatch technology it is important that the particle size and the bulk density of the masterbatch are similar to the particle size and the bulk density of the thermoplastic, so that homogeneous distribution and thus homogeneous UV resistance can be achieved.

The inventive films may be produced by known processes for example from a polyester with, where appropriate, other raw materials and with the UV stabilizer, and/or with other customary additives in customary amounts of from 0.1 to a maximum of 10% by weight, either in the form of a monofilm or else in the form of, where appropriate coextruded, films having more than one layer and with identical or differently constructed surfaces, where one surface may, for example, have been pigmented but no pigment is present at the other surface. Known processes may also have been used to provide one or both surfaces of the film with a conventional functional coating.

In the preferred extrusion process for producing an inventive polyester film, the molten polyester material is extruded through a slot die and quenched on a chill roll, in the form of a substantially amorphous prefilm. This amorphous prefilm is then reheated and stretched longitudinally and transversely, or transversely and longitudinally, or longitudinally, transversely and again longitudinally and/or transversely. In general, the stretching temperatures are from $T_g+10°$ C. to $T_g+60°$ C. (where $T_g$ is the glass transition temperature), the longitudinal stretching ratio is usually from 2 to 6, in particular from 3 to 4.5, and the transverse stretching ratio is from 2 to 5, in particular from 3 to 4.5, and the ratio for any second longitudinal stretching carried out is from 1.1 to 3. The first longitudinal stretching may, where appropriate, be carried out simultaneously with the transverse stretching (simultaneous stretching). This is followed by the heat-setting of the film at oven temperatures of from 200 to 260° C., in particular from 220 to 250° C. The film is then cooled and wound up.

The surprising combination of excellent properties makes the transparent film of the invention, and moldings produced therefrom, highly suitable for a variety of applications, e.g. for interior decoration, for constructing exhibition stands, for exhibition requisites, for displays, for placards, for protective glazing of machines or vehicles, in the lighting sector, in fitting out shops or stores, or as a promotional requisite or laminating material.

Due to its good UV resistance, the transparent film of the invention is also suitable for outdoor applications, e.g. for greenhouses, roofing systems, exterior cladding, protective coverings, applications in the construction sector or illuminated advertising profiles.

Due to its thermoformability, the film of the invention is suitable for thermoforming any desired moldings for indoor or outdoor applications.

Examples are used below to describe the invention in more detail.

The following standards and methods are used here when testing individual properties.
Test Methods
 DIN=Deutsches Institut fur Normung [German Institute for Standardization] ISO=International Organization for Standardization
DEG Content/PEG Content/IPA Content
 DEG/PEG/IPA content is determined by gas chromatography after saponification in methanolic KOH and neutralization with aqueous HCl.
Surface Gloss
 Surface gloss is measured with a measurement angle of 20° to DIN 67530.
Light Transmittance
 For the purposes of the present invention, the light transmittance is the ratio of total light transmitted to the amount of incident light.
 Light transmittance is measured using "®Hazegard plus" test equipment to ASTM D 1003.
Haz
 Haze is that percentage proportion of the transmitted light which deviates by more than 2.5° from the average direction of the incident light beam. Clarity is determined at an angle of less than 2.5°.
 Haze is measured using "Hazegard plus" apparatus to ASTM D 1003.
Surface Defects
 Surface defects are determined visually.
Mechanical Properties
 Modulus of elasticity, tear strength and elongation at break are measured longitudinally and transversely to ISO 527-1-2.

SV (DCA) and IV (DCA)
 Standard viscosity SV (DCA) is measured by a method based on DIN 53726 in dichloroacetic acid.
 Intrinsic viscosity (IV) is calculated as follows from the standard viscosity (SV)

$$IV(DCA) = 6.67 \cdot 10^{-4} SV(DCA) + 0.118$$

Weathering (on Both Sides) and UV Resistance
 UV resistance is tested as follows to the test specification of ISO 4892

| | |
|---|---|
| Test equipment | Atlas Ci65 Weather-Ometer |
| Test conditions | ISO 4892, i.e. artificial weathering |
| Irradiation time | 1000 hours (per side) |
| Irradiation | 0.5 W/m², 340 nm |
| Temperature | 63° C. |
| Relative humidity | 50% |
| Xenon lamp | Internal and external filter made from borosilicate |
| Irradiation cycles | 102 minutes of UV light, then 18 minutes of UV light with water spray onto the specimens, then another 102 minutes of UV light, etc. |

Yellowness Index
 Yellowness Index YI is the deviation from the colorless condition in the "yellow" direction and is measured to DIN 6167. Yellowness Index values (YI)<5 are not visible.
 In the examples and comparative examples below each of the films is a transparent film of different thickness, produced on the extrusion line described.
 Each of the films was first weathered to the test specification of ISO 4892 for 1000 hours per side, using an Atlas Ci65 Weather-Ometer, and then tested for mechanical properties, discoloration, surface defects, haze and gloss.

EXAMPLES

Example 1

A transparent film of 50 μm thickness is produced, comprising polyethylene terephthalate as principal constituent, 0.3% by weight of ◊Sylobloc, and 1.0% by weight of the UV stabilizer 2-(4,6-diphenyl-1,3,5-triazin-2-yl)-5-(hexyl)oxyphenol (®Tinuvin 1577 from Ciba-Geigy).

Tinuvin 1577 has a melting point of 149° C. and is thermally stable up to about 330° C.

To obtain homogeneous distribution, 0.3% by weight of Sylobloc and 1.0% by weight of the UV stabilizer are incorporated directly into the polyethylene terephthalate at the premises of the producer of the raw material.

The polyethylene terephthalate from which the transparent film is produced has a standard viscosity SV (DCA) of 810, corresponding to an intrinsic viscosity IV (DCA) of 0.658 dl/g, and has a DEG content of 1.6% by weight and a PEG content of 1.7% by weight.

The 50 μm monofilm is produced by the extrusion process described.

The transparent PET film produced has the following property profile:

| | |
|---|---|
| Thickness | 50 μm |
| Surface gloss, (Measurement angle 20°) Side 1 | 155 |
| Side 2 | 152 |
| Light transmittance | 91% |

-continued

| | | |
|---|---|---|
| Haze | | 4.0% |
| Surface defects per m² | | none |
| Longitudinal modulus of elasticity | | 3700 N/mm² |
| Transverse modulus of elasticity | | 4900 N/mm² |
| Longitudinal tensile stress at break | | 120 N/mm² |
| Transverse tensile stress at break | | 200 N/mm² |
| Yellowness Index (YI) | | 3.1 |

After 1000 hours of weathering per side using an Atlas Ci65 Weather-Ometer, the PET film has the following properties:

| | | |
|---|---|---|
| Thickness | | 50 m |
| Surface gloss, | Side 1 | 145 |
| (Measurement angle 20°) | Side 2 | 141 |
| Light transmittance | | 90.1% |
| Haze | | 4.5% |
| Surface defects per m² (cracks, embrittlement) | | none |
| Yellowness Index (YI) | | 3.6 |
| Longitudinal modulus of elasticity | | 3650 N/mm² |
| Transverse modulus of elasticity | | 4850 N/mm² |
| Longitudinal tensile strength at break | | 110 N/mm² |
| Transverse tensile strength at break | | 200 N/mm² |

Example 2

Using a method based on Example 1, a transparent film is produced, the UV stabilizer 2-(4,6-diphenyl-1,3,5-triazin-2-yl)-5-(hexyl)oxyphenol (®Tinuvin 1577) being added in the form of a masterbatch. The masterbatch is composed of 5% by weight of ®Tinuvin 1577 as active component and 95% by weight of the polyethylene terephthalate from Example 1.

Prior to extrusion, 90% by weight of the polyethylene terephthalate from Example 1 are dried with 10% by weight of the masterbatch for 5 hours at 170° C. Extrusion and film production take place by a method based on Example 1.

The transparent PET film produced has the following property profile:

| | | |
|---|---|---|
| Thickness | | 50 μm |
| Surface gloss, | Side 1 | 160 |
| (Measurement angle 20°) | Side 2 | 157 |
| Light transmittance | | 91.3% |
| Haze | | 3.8% |
| Surface defects | | none |
| Longitudinal modulus of elasticity | | 3600 N/mm² |
| Transverse modulus of elasticity | | 4800 N/mm² |
| Longitudinal tensile stress at break | | 110 N/mm² |
| Transverse tensile stress at break | | 190 N/mm² |
| Yellowness Index (YI) | | 3.4 |

After 1000 hours of weathering per side using an Atlas Ci65 Weather-Ometer, the PET film has the following properties:

| | | |
|---|---|---|
| Thickness | | 50 μm |
| Surface gloss, | Side 1 | 148 |
| (Measurement angle 20°) | Side 2 | 146 |
| Light transmittance | | 89.9% |
| Haze | | 4.1% |
| Surface defects | | none |
| Yellowness Index (YI) | | 4.3 |
| Longitudinal modulus of elasticity | | 3500 N/mm² |
| Transverse modulus of elasticity | | 4700 N/mm² |
| Longitudinal tensile stress at break | | 100 N/mm² |
| Transverse tensile stress at break | | 170 N/mm² |

Example 3

Using a method based on Example 2, a transparent film of thickness 350 μm is produced. The PET film produced has the following property profile:

| | | |
|---|---|---|
| Thickness | | 350 μm |
| Surface gloss, | Side 1 | 149 |
| (Measurement angle 20°) | Side 2 | 144 |
| Light transmittance | | 84.1% |
| Haze | | 13.1% |
| Surface defects per m² | | none |
| Yellowness Index | | 4.5 |
| Longitudinal modulus of elasticity | | 3100 N/mm² |
| Transverse modulus of elasticity | | 3600 N/mm² |
| Longitudinal tensile stress at break | | 110 N/mm² |
| Transverse tensile stress at break | | 190 N/mm² |

After 1000 hours of weathering per side using an Atlas Ci65 Weather-Ometer, the PET film has the following properties:

| | | |
|---|---|---|
| Thickness | | 350 μm |
| Surface gloss, | Side 1 | 136 |
| (Measurement angle 20°) | Side 2 | 131 |
| Light transmittance | | 84.3% |
| Haze | | 14.0% |
| Surface defects (cracks, embrittlement) | | none |
| Yellowness Index (YI) | | 5.4 |
| Longitudinal modulus of elasticity | | 3050 N/mm² |
| Transverse modulus of elasticity | | 3500 N/mm² |
| Longitudinal tensile stress at break | | 100 N/mm² |
| Transverse tensile stress at break | | 160 N/mm² |

Example 4

Coextrusion technology is used to produce a multilayer PET film of 50 μm thickness with the layer sequence A-B-A, B being the core layer and A being the outer layers. The thickness of the core layer B is 48 μm and that of each of the two outer layers which cover the core layer is 1 μm.

The polyethylene terephthalate used for the core layer B is identical with that from Example 1, except that it comprises no Sylobloc®. The polyethylene terephthalate of the outer layers A is identical with the polyethylene terephthalate from Example 1, i.e. the raw material for the outer layers has 0.3% by weight of Sylobloc.

Using a method based on Example 2, the 5% strength by weight ®Tinuvin 1577 masterbatch is used, but 20% by weight of the masterbatch are added, by way of masterbatch technology, only to the outer layers of 1 μm thickness.

The transparent multilayer PET film produced, with UV-resistant outer layers, has the following property profile:

| | | |
|---|---|---|
| Layer structure | | A-B-A |
| Total thickness | | 50 μm |
| Surface gloss, | Side 1 | 164 |
| (Measurement angle 20°) | Side 2 | 159 |
| Light transmittance | | 94.2% |
| Haze | | 2.1% |
| Surface defects | | none |
| Longitudinal modulus of elasticity | | 3750 N/mm$^2$ |
| Transverse modulus of elasticity | | 4950 N/mm$^2$ |
| Longitudinal tensile stress at break | | 130 N/mm$^2$ |
| Transverse tensile stress at break | | 210 N/mm$^2$ |
| Yellowness Index (YI) | | 2.9 |

After 1000 hours of weathering per side using an Atlas Ci65 Weather-Ometer, the multilayer film has the following properties:

| | | |
|---|---|---|
| Layer structure | | A-B-A |
| Total thickness | | 50 μm |
| Surface gloss, | Side 1 | 152 |
| (Measurement angle 20°) | Side 2 | 150 |
| Light transmittance | | 92.3% |
| Haze | | 3.0% |
| Surface defects | | none |
| Longitudinal modulus of elasticity | | 3550 N/mm$^2$ |
| Transverse modulus of elasticity | | 4800 N/mm$^2$ |
| Longitudinal tensile stress at break | | 115 N/mm$^2$ |
| Transverse tensile stress at break | | 185 N/mm$^2$ |
| Yellowness Index (YI) | | 3.0 |

The inventive examples show that the optical and mechanical properties of the films meet the high requirements set, while at the same time UV resistance has been substantially increased.

The films from Examples 1–4 may be thermoformed without predrying to produce moldings on commercially available thermoforming machinery, e.g. from the company Illig. The reproduction of detail in the moldings is excellent, and the surface is uniform.

Comparative Example 1

Using a method based on Example 1, a PET monofilm of 50 μm thickness is produced. Unlike in Example 1, no UV stabilizer is present in the film. The PET used has a conventional DEG content of 0.6% by weight and comprises no PEG.

The unstabilized transparent film produced has the following property profile:

| | | |
|---|---|---|
| Thickness | | 50 μm |
| Surface gloss, | Side 1 | 160 |
| (Measurement angle 20°) | Side 2 | 155 |
| Light transmittance | | 91.8% |
| Haze | | 3.6% |
| Surface defects | | none |
| Longitudinal modulus of elasticity | | 4350 N/mm$^2$ |
| Transverse modulus of elasticity | | 5800 N/mm$^2$ |
| Longitudinal tensile stress at break | | 185 N/mm$^2$ |
| Transverse tensile stress at break | | 270 N/mm$^2$ |
| Longitudinal tensile strain at break | | 160% |
| Transverse tensile strain at break | | 80% |
| Yellowness Index (YI) | | 2.7 |

The film has inadequate thermoformability.

After 1000 hours of weathering per side using an Atlas Ci65 Weather-Ometer, the film has surface cracks and embrittlement phenomena. It therefore becomes impossible to measure any accurate property profile, in particular mechanical properties. In addition, the film exhibits visible yellowing.

What is claimed is:

1. A transparent, oriented thermoformable film comprising a crystallizable thermoplastic or a mixture of different crystallizable thermoplastics and at least one UV stabilizer, said crystallizable thermoplastic comprising at least one of either diethylene glycol or polyethylene glycol present in an amount of greater than or equal to 1.0% by weight.

2. The film as claimed in claim 1, characterized in that the thermoplastic has a crystallinity of from about 5 to about 65%.

3. The film as claimed in claim 1, characterized in that the thermoplastic comprises a polyester.

4. The film as claimed in claim 1, characterized in that the thermoplastic comprises polyethylene terephthalate, polybutylene terephthalate or polyethylene naphthalate.

5. The film as claimed in claim 4, characterized in that the thermoplastic comprises polyethylene terephthalate.

6. The film as claimed in claim 4, characterized in that the thermoplastic consists essentially of polyethylene terephthalate having a diethylene glycol content or a polyethylene glycol content or a diethylene glycol content and a polyethylene glycol content of more than about 1.3% by weight.

7. The film as claimed in claim 4, characterized in that the thermoplastic consists essentially of polyethylene terephthalate having a diethylene glycol content or a polyethylene glycol content or a diethylene glycol content and a polyethylene glycol content of from about 1.6 to about 6% by weight.

8. The film as claimed in claim 5, characterized in that the polyethylene terephthalate has a standard viscosity SV (DCA) of from about 600 to about 1000.

9. The film as claimed in claim 1, wherein the UV stabilizer comprises 2-hydroxybenzotriazoles or triazines or mixtures of these UV stabilizers.

10. The film as claimed in claim 1, wherein the UV stabilizer comprises 2-(4,6-diphenyl-1,3,5-triazin-2-yl)-5-hexyloxyphenol or 2,2'-methylenebis-6-(2H-benzotriazol-2-yl)-4-(1,1,2,2-tetramethylpropyl)phenol or mixtures of these UV stabilizers or mixtures of these UV stabilizers with others.

11. The film as claimed in claim 1, wherein the concentration of the UV stabilizer or UV stabilizers is from about 0.01 to about 5% by weight, based on the weight of the layer of the crystallizable thermoplastic or thermoplastics.

12. The film as claimed in claim 1, wherein the film has two or more layers.

13. The film as claimed in claim 12, wherein the UV stabilizer is present in the outer layer or layers.

14. The film as claimed in claim 1, wherein the film has a thickness of from about 1 to about 500 μm.

15. The film as claimed in claim 1, wherein the film is biaxially oriented.

16. The film as claimed in claim 5, wherein the polyethylene terephthalate has a crystallite melting point, measured by DSC with a heating rate of 10° C./min, of from about 220 to about 280° C.

17. The film as claimed in claim 5, wherein the polyethylene terephthalate has a crystallization temperature, measured by DSC with a heating rate of 10° C./min, of from about 75 to about 280° C.

18. The film as claimed in claim 12, wherein the outer layer or outer layers comprise polyethylene naphthalate.

19. The film as claimed in claim 12, wherein the outer layer or outer layer, comprise copolymers or compounds made from polyethylene terephthalate and polyethylene naphthalate.

20. A process for producing a film am claimed in claim 1, comprising the steps of melting a crystallizable thermoplastic or a mixture made from crystallizable thermoplastic in an extruder together with at least one UV stabilizer, extruding the melt to yield a prefilm, orienting the prefilm to yield a biaxially oriented film, and heat setting the biaxially oriented film.

21. The process as claimed in claim 20, wherein the UV stabilizer or a mixture containing the UV stabilizer is added by way of masterbatch technology.

22. A method of making a molding comprising transforming a film as claimed in claim 1 into a molding.

23. A molding comprising a film as claimed in claim 1.

24. A transparent, oriented thermoformable film comprising a crystallizable thermoplastic or a mixture of different crystallizable thermoplastic and at least one UV stabilizer, said crystallizable thermoplastic including a glycol composition comprising a mixture of a diethylene glycol and polyethylene glycol, said diethylene glycol present in an amount of greater than or equal to 1.0% by weight and said polyethylene glycol present In an amount of greater than or equal to 1.2% by weight, wherein said glycol composition includes a greater amount of polyethylene glycol than diethylene glycol.

25. A transparent, biaxially oriented thermoformable film comprising a crystallizable thermoplastic or a mixture of different crystallizable thermoplastics and at least one UV stabilizer, said thermoplastic consisting essentially of polyethylene terephthalate having at least one of either a diethylene glycol content or a polyethylene glycol content of more than about 1.3% by weight, said film formed using a single-step longitudinal orientation.

* * * * *